(12) United States Patent
Kim et al.

(10) Patent No.: US 8,432,992 B2
(45) Date of Patent: Apr. 30, 2013

(54) METHOD FOR TRANSMITTING FEEDBACK INFORMATION IN MULTI INPUT MULTI OUT PUT SYSTEM BASED ON CODEBOOK AND A METHOD FOR TRANSMITTING PRECODING INFORMATION IN MULTI INPUT MULTI OUTPUT SYSTEM USING CODEBOOK-BASES PRECODING SCHEME

(75) Inventors: Jae Wan Kim, Anyang-si (KR); Bin Chul Ihm, Anyang-si (KR); Jin Young Chun, Anyang-si (KR); Jin Hyuk Jung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 463 days.

(21) Appl. No.: 12/733,263

(22) PCT Filed: Nov. 4, 2008

(86) PCT No.: PCT/KR2008/006491
§ 371 (c)(1),
(2), (4) Date: May 10, 2010

(87) PCT Pub. No.: WO2009/061115
PCT Pub. Date: May 14, 2009

(65) Prior Publication Data
US 2010/0239041 A1     Sep. 23, 2010

(30) Foreign Application Priority Data
Nov. 5, 2007 (KR) .................. 10-2007-0112023

(51) Int. Cl.
*H04B 7/02* (2006.01)
(52) U.S. Cl.
USPC .......................................... 375/267
(58) Field of Classification Search .................. 375/260, 375/267, 295, 299, 316; 455/68–69, 562.1
See application file for complete search history.

(56) References Cited

U.S. PATENT DOCUMENTS

| | | | |
|---|---|---|---|
| 7,839,945 B2 * | 11/2010 | Khojastepour et al. ........ | 375/267 |
| 7,873,016 B2 * | 1/2011 | Kim .............................. | 370/338 |
| 7,957,701 B2 * | 6/2011 | Alexiou et al. ................. | 455/69 |
| 8,180,314 B2 * | 5/2012 | Kim .............................. | 455/338 |
| 2007/0104288 A1 * | 5/2007 | Kim .............................. | 375/267 |
| 2007/0206626 A1 | 9/2007 | Lee et al. | |
| 2008/0227495 A1 * | 9/2008 | Kotecha et al. ............ | 455/562.1 |

FOREIGN PATENT DOCUMENTS

| | | |
|---|---|---|
| KR | 10-2001-0036597 | 5/2001 |
| KR | 10-2002-0089094 | 11/2002 |

\* cited by examiner

*Primary Examiner* — Khanh C Tran
(74) *Attorney, Agent, or Firm* — McKenna Long & Aldridge LLP (57) ABSTRACT

A method for transmitting feedback information in a codebook-based multiple-input multiple-output (MIMO) system is disclosed. To transmit the feedback information, a signal is received to discern channel characteristics of the received signal, and a codebook is updated using an extended matrix including a plurality of vector components and using previous feedback information. Feedback information is selected for transmission from the updated codebook in consideration of the channel characteristics of the received signal.

5 Claims, 3 Drawing Sheets

METHOD FOR TRANSMITTING FEEDBACK INFORMATION IN MULTI INPUT MULTI OUT PUT SYSTEM BASED ON CODEBOOK AND A METHOD FOR TRANSMITTING PRECODING INFORMATION IN MULTI INPUT MULTI OUTPUT SYSTEM USING CODEBOOK-BASES PRECODING SCHEME

This application is a 35 U.S.C. §371 National Stage of International Application No. PCT/KR2008/006491, filed on Nov. 4, 2008, and claims priority to Korean Application No. KR 10-2007-0112023, filed on Nov. 5, 2007 which is hereby incorporated by reference in its entirety as if fully set forth herein.

TECHNICAL FIELD

The present invention relates to a codebook-based multiple-input multiple-output (MIMO) system, and more particularly, to a method for transmitting feedback information in a codebook-based MIMO system and a method for transmitting precoding information in a MIMO system using a codebook-based precoding scheme.

BACKGROUND ART

A MIMO precoding scheme is one of MIMO system schemes for improving communication performance by feeding back a part of or all channel information, using a closed-loop mode. The precoding scheme has advantageous effects, especially in a slow fading environment of less than 30 Km per hour.

Feeding back all of the channel information increases overhead. Accordingly, a MIMO precoding scheme, which quantizes channel information to configure a codebook and transmits an index allocated to each codebook element through a control channel using a part of the channel information, is actually applied to a system through standardization.

When a combination of beamforming and MIMO is utilized using a codebook-based beamforming scheme and an X-pol antenna, a dead zone where a terminal is distanced from a corresponding beam and thus a signal becomes weak is generated while a user of the terminal is moving. Even in a beamforming scheme which is not based on a codebook, since a frequency division diversity scheme generates a difference in characteristic between upper and lower channels in calculating an antenna weighting factor, accurate beamforming is not performed and thus gain loss occurs. Therefore, it is necessary for a receiving stage to determine a channel state of a receiving channel and feed back information thereof to a transmitting stage.

Feedback overhead can, to some degree, be reduced using a codebook. However, a quantization error, which may be generated due to quantization of channel information, and an error due to a feedback delay can not be disregarded. To relieve limitations of the use of the codebook, research into methods for reducing the quantization error or the feedback delay error, and feedback overhead by flexibly varying elements of the codebook according to variations of a channel in a time or frequency region has recently been conducted.

DISCLOSURE

[Technical Problem]

An object of the present invention devised to solve the problem lies in providing a method for transmitting feedback information in a codebook-based MIMO system. Another object of the present invention lies in providing a method for transmitting precoding information in a codebook-based MIMO system. A further object of the present invention lies in providing a tracking scheme used by updating a codebook in a codebook-based MIMO system.

[Technical Solution]

The object of the present invention can be achieved by providing a feedback method in a MIMO system using a codebook, comprising estimating a reception channel by receiving a signal, and feeding back a codeword selected in consideration of the estimated channel from a codebook which is updated using a phase shift matrix having phase values as parameters and using previous feedback information.

In another aspect of the present invention, provided herein is a method for transmitting precoding information in a multiple-input multiple-output (MIMO) system using a codebook-based precoding scheme. The method comprises determining to operate in a codebook updating mode, feeding back first precoding information selected from a first codebook, receiving a signal, and feeding back second precoding information selected from a second codebook in consideration of channel characteristics of the received signal, wherein the second codebook is configured by a phase shift matrix having phase values as parameters and using the first precoding information.

The second codebook may determine a plurality of phase shift matrices by determining a plurality of phase values and may determine codebook codewords by multiplying each of the determined phase shift matrices by a vector component according to the first precoding information to include the determined codebook codewords.

The phase values may be determined by adding or subtracting integral times of a phase interval to or from the first precoding information. The phase interval may be generated by equally dividing a phase range into a number corresponding to the number of feedback bits.

The precoding information may be repeatedly transmitted the predetermined number of times, and each of the phase values may be reset to 0° at a preset repetition period.

ADVANTAGEOUS EFFECTS

According to the present invention, when using a codebook of a MIMO precoding scheme in an environment where a channel varies due to slow fading, a quantization error or a feedback delay error, and feedback overhead can be reduced.

When a channel varies due to slow fading, limitations of performance according to the size of a codebook in a conventional closed-loop MIMO precoding scheme can be improved. Further, a reduction in the amount of overhead which is fed back is expected.

When a tracking mode is additionally designated so as to use a conventional codebook, modification to the tracking mode is easily accomplished and complexity is low, when a reduction in the amount of feedback overhead is requested while closed-loop transmission/reception is performed.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the term 'base station' refers to a terminal node of a network communicating directly with the mobile station. In some cases, a specific operation described as performed by the base station may be performed by an upper node of the base station. Namely, it is apparent that, in a network comprised of a plurality of network nodes including a base station, various operations performed for communication with a mobile station may be performed by the base station, or network nodes other than the base station. The term 'base station' may be replaced with the term 'fixed station', 'Node B', 'eNode B' (eNB), 'access point', etc. The term 'mobile station' may be replaced with the term 'mobile terminal', 'user equipment' (UE), 'mobile subscriber station'(MSS), etc.

The present invention provides a codebook updating method which can reflect channel variations in a MIMO system which transmits feedback information using a codebook. In a system using a codebook-based precoding scheme, the present invention may be applied for precoding tracking which is capable of reflecting a channel state using the codebook updating method. The present invention may also be applied for location tracking of a terminal in a system using a codebook-based beamforming scheme. Hereinafter, each vector component constituting the codebook is called a codeword.

In the embodiment of the present invention, a current channel state can be reflected using an extended matrix including a plurality of vector components in order to update a codebook. In this case, the codebook can be updated based on previous transmission using the codebook used for previous transmission or a codeword of the codebook. In consideration of channel characteristics of a received signal, channel variations can be reflected by selectively transmitting a codeword from the updated codebook.

Hereinafter, the embodiment of the present invention will be described. A description will now be given of a codebook updating method which uses, as an extended matrix, a phase shift matrix including phase values as parameters and uses, as a base matrix, a discrete Fourier transform (DFT) unitary matrix forming orthogonal beam patterns.

The following Equation 1 illustrates an example of the phase shift matrix including phase values as parameters.

$$P_N(\phi_i) = \begin{pmatrix} 1 & 0 & 0 & \cdots & 0 \\ 0 & e^{j\phi_i} & 0 & \cdots & 0 \\ 0 & 0 & e^{j2\phi_i} & \cdots & 0 \\ \vdots & \vdots & \vdots & \ddots & \vdots \\ 0 & 0 & 0 & \cdots & e^{j(N-1)\phi_i} \end{pmatrix} \quad \text{[Equation 1]}$$

Equation 1 shows a phase shift matrix which can be used especially when the number of rows of a base matrix is N. In Equation 1, $\phi_i$ denotes a phase value determined according to a predefined rule.

One method for determining the phase value $\phi_i$ will now be described. First, a predetermined phase range for determining the phase value is determined. Next, the phase range is equally divided in K ranges to determine one phase interval. Then the phase value $\phi_i$ can be determined using the determined phase range and phase interval. The following Equation 2 shows one example of determining the phase value as a mathematical expression. In Equation 2, each phase value is determined by multiplying an integer by a predefined phase interval. The predefined phase interval is obtained by equally dividing the phase range.

$$\phi_i = \frac{2\pi * i}{KN}, i = 0, 1, 2, \ldots, L-1 \quad \text{[Equation 2]}$$

Referring to Equation 2, the phase range is determined as $$0° \sim \frac{2\pi}{N}$$

and the determined phase range is equally divided by K, thereby obtaining one phase interval. Here, N and K are any real numbers. For example, the phase range may be determined according to the number or interval of transmit and receive antenna elements, the number of beam patterns, etc.

Another method for determining the phase value $\phi_i$ will now be described. The number of determined phase values may be the number of codewords included in a codebook. For example, if feedback information is expressed by M bits, the number of channel states which can be expressed by M bits, that is, the number of codewords included in the codebook will be $2^M$ (=L). Therefore, the number of phase values is L (i=0, 1, 2, ..., L−1).

This may be expressed as shown in the following Equation 3.

$$\Delta\phi = \frac{\phi_{range}}{L} \qquad \text{[Equation 3]}$$

Each phase value may be determined by setting an initial value to 0° or to a phase value determined during previous transmission, and adding or subtracting a value, which is obtained by multiplying the determined phase interval by an integer, to or from the set initial value. This may be expressed by the following Equation 4.

$$\phi_{i,t} = \phi_{t-1} + f(i)\Delta\phi \qquad \text{[Equation 4]}$$

$$f(i) = \left\{-\frac{L}{2}, -\left(\frac{L}{2}-1\right), \ldots, -2, -1, 0, 1, 2, \ldots, \frac{L}{2}-1, \frac{L}{2}\right\}$$

In Equation 4, 't' denotes an index related to the number of codebook updates and may be an integer greater than 1. If t=1, that is, if codebook updating is first performed, the phase value may be 0°. As seen from Equation 4, each phase value $\phi_i$ will be evenly distributed to the right and left centering around 0° or a phase value determined during previous transmission.

In Equation 4, f(i) may selectively use L integers among integers between $$-\frac{L}{2} \text{ and } \frac{L}{2}.$$

For example, i may be an integer between $$-\left(\frac{L}{2}-1\right) \text{ and } \frac{L}{2}$$

or an integer between $$-\frac{L}{2} \text{ and } \frac{L}{2}-1.$$

Such a case is advantageous in that the same phase value as a previous phase value can be selected in a codebook updating mode. As another example, i may be an integer between $$-\left(\frac{L}{2}-1\right)$$

and −1 or an integer between 1 and L/2. Although at this time the same phase value as the previous phase value in the codebook updating mode can not be selected, a further extended phase value can be selected.

A plurality of phase values is determined through the above-described method, thereby generating a phase shift matrix corresponding to each phase value and performing codebook updating using the phase shift matrix.

The following Equation 5 shows a DFT unitary matrix forming an orthogonal beam pattern.

$$B_1 = \{b_{1,0}, b_{1,1}, \ldots, b_{1,N-1}\} \qquad \text{[Equation 5]}$$

$$= \frac{1}{\sqrt{N}}\left\{\begin{pmatrix}1\\1\\1\\\vdots\\1\end{pmatrix}, \begin{pmatrix}1\\e^{j\frac{2\pi}{N}}\\e^{j2\frac{2\pi}{N}}\\\vdots\\e^{j(N-1)\frac{2\pi}{N}}\end{pmatrix}, \ldots, \begin{pmatrix}1\\e^{j(N-1)\frac{2\pi}{N}}\\e^{j2(N-1)\frac{2\pi}{N}}\\\vdots\\e^{j(N-1)^2\frac{2\pi}{N}}\end{pmatrix}\right\}$$

Here, N denotes an integer determining the number of rows, and may be determined according to the number of transmit antenna elements in case of precoding or according to the number of beam patterns in case of beamforming. The DFT unitary matrix $B_1$ comprised of N column vectors {$b_{1,0}$, $b_{1,1}$, ..., $b_{1,N-1}$} may be expressed by Equation 5.

Hereinafter, a codebook updating method will be described using the aforementioned phase shift matrix and the DEF matrix.

When codebook updating is not performed, or even when it is determined to perform the codebook updating, a codework $b_{1,k}$ having the best reception performance based on a received signal is selected among codewords of a base codebook, $B_1$, that is, among the column vectors during first feedback. Here, k (where k=0, 1, ..., N−1) is a codeword index within the codebook.

In a codebook updating mode, an existing codebook can be updated by generating a plurality of phase shift matrices so that a channel state of a currently received signal or moving circumstances of a terminal can be reflected. As described above, a plurality of phase shift matrices is generated according to a plurality of phase values having a phase interval of right and left symmetry corresponding to a codebook size N within a prescribed phase range $\phi_{range}$ centering around a phase value $\phi_i$ of a codeword $b_{1,k}$ used for previous transmission. The generated phase shift matrix may be expressed by the following Equation 6.

$$P_N(\phi_0) = \begin{pmatrix} 1 & 0 & 0 & \cdots & 0 \\ 0 & e^{j\phi_0} & 0 & \cdots & 0 \\ 0 & 0 & e^{j2\phi_0} & \cdots & 0 \\ \vdots & \vdots & \vdots & \ddots & \vdots \\ 0 & 0 & 0 & \cdots & e^{j(N-1)\phi_0} \end{pmatrix}$$ [Equation 6]

$$P_N(\phi_1) = \begin{pmatrix} 1 & 0 & 0 & \cdots & 0 \\ 0 & e^{j\phi_1} & 0 & \cdots & 0 \\ 0 & 0 & e^{j2\phi_1} & \cdots & 0 \\ \vdots & \vdots & \vdots & \ddots & \vdots \\ 0 & 0 & 0 & \cdots & e^{j(N-1)\phi_1} \end{pmatrix}$$

$$\vdots$$

$$P_N(\phi_{L-1}) = \begin{pmatrix} 1 & 0 & 0 & \cdots & 0 \\ 0 & e^{j\phi_{L-1}} & 0 & \cdots & 0 \\ 0 & 0 & e^{j2\phi_{L-1}} & \cdots & 0 \\ \vdots & \vdots & \vdots & \ddots & \vdots \\ 0 & 0 & 0 & \cdots & e^{j(N-1)\phi_{L-1}} \end{pmatrix}$$

An updated codebook can be generated by applying the generated plurality of phase shift matrices to the codeword used for previous transmission. A codeword $b_{2,k}$ is selected by selecting a codeword having the best reception performance based on a received signal, using the updated codebook.

Such a codebook update operation can be performed up to several times. An example of a method for updating a codebook by as many as the number of times between 't' and 't+1' will be described using a mathematical expression by generalizing the above-described codebook updating method.

The following Equation 7 shows an example of a codebook updating method which can be generated through the 't' number of update operations.

$$B_t = \{b_{t,0}, b_{t,1}, \ldots, b_{t,N-1}\}$$ [Equation 7]
$$= \{P_N(\phi_0), P_N(\phi_1), \ldots, P_N(\phi_{L-1})\} \times b_{t-1,k}$$
$$= \{P_N(\phi_0) \times b_{t-1,k}, P_N(\phi_1) \times b_{t-1,k}, \ldots, P_N(\phi_{L-1}) \times b_{t-1,k}\}$$

In Equation 7, 't' of $B_t$ denotes the number of codebook updates. In the first codebook update operation, 't' is set to 1 and may be increased by 1 whenever the update operation is performed. Moreover, $b_{t-1,k}$ denotes a codeword selected from a codebook updated from the (t−1)-th codebook update operation and 'k' (where k=0, 1, 2, . . . , N−1) denotes a codeword index within a codebook.

When using the above Equation 3 and Equation 4 to determine a phase value, the updated codebook of Equation 7 may be expressed in more detail by the following Equation 8a or Equation 8b.

$$B_t = \{b_{t,0}, b_{t,1}, \ldots, b_{t,N-1}\} =$$ [Equation 8a]

$$\frac{1}{\sqrt{N}} \left\{ \begin{pmatrix} 1 \\ e^{-j(\frac{N}{2}-1)\frac{\phi_{range}}{L}} \\ e^{-2j(\frac{N}{2}-1)\frac{\phi_{range}}{2L}} \\ \vdots \\ e^{-(N-1)j(\frac{N}{2}-1)\frac{\phi_{range}}{2L}} \end{pmatrix} b_{t-1,k} \ldots, \right.$$

$$\begin{pmatrix} 1 \\ e^{-j2\frac{\phi_{range}}{L}} \\ e^{-2j2\frac{\phi_{range}}{L}} \\ \vdots \\ e^{-(N-1)j2\frac{\phi_{range}}{L}} \end{pmatrix} b_{t-1,k},$$

$$\begin{pmatrix} 1 \\ e^{-j\frac{\phi_{range}}{L}} \\ e^{-2j\frac{\phi_{range}}{L}} \\ \vdots \\ e^{-(N-1)j\frac{\phi_{range}}{L}} \end{pmatrix} b_{t-1,k}, \begin{pmatrix} 1 \\ 1 \\ 1 \\ \vdots \\ 1 \end{pmatrix} b_{t-1,k},$$

$$\begin{pmatrix} 1 \\ e^{j\frac{\phi_{range}}{L}} \\ e^{2j\frac{\phi_{range}}{L}} \\ \vdots \\ e^{(N-1)j\frac{\phi_{range}}{L}} \end{pmatrix} b_{t-1,k},$$

$$\begin{pmatrix} 1 \\ e^{j2\frac{\phi_{range}}{L}} \\ e^{2j2\frac{\phi_{range}}{L}} \\ \vdots \\ e^{(N-1)j2\frac{\phi_{range}}{L}} \end{pmatrix} b_{t-1,k} \ldots,$$

$$\left. \begin{pmatrix} 1 \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}} \end{pmatrix} b_{t-1,k} \right\}$$

$$B_t = \{b_{t,0}, b_{t,1}, \ldots, b_{t,N-1}\} = \quad \text{[Equation 8b]}$$

$$\frac{1}{\sqrt{N}} \left\{ \begin{pmatrix} 1 \\ e^{-j\frac{N}{2}\frac{\phi_{range}}{L}} \\ e^{-2j\frac{N}{2}\frac{\phi_{range}}{2L}} \\ \vdots \\ e^{-(N-1)j\frac{N}{2}\frac{\phi_{range}}{2L}} \end{pmatrix} b_{t-1,k} \ldots, \right.$$

$$\begin{pmatrix} 1 \\ e^{-j2\frac{\phi_{range}}{L}} \\ e^{-2j2\frac{\phi_{range}}{L}} \\ \vdots \\ e^{-(N-1)j2\frac{\phi_{range}}{L}} \end{pmatrix} b_{t-1,k},$$

$$\begin{pmatrix} 1 \\ e^{-j\frac{\phi_{range}}{L}} \\ e^{-2j\frac{\phi_{range}}{L}} \\ \vdots \\ e^{-(N-1)j\frac{\phi_{range}}{L}} \end{pmatrix} b_{t-1,k}, \begin{pmatrix} 1 \\ e^{j\frac{\phi_{range}}{L}} \\ e^{2j\frac{\phi_{range}}{L}} \\ \vdots \\ e^{(N-1)j\frac{\phi_{range}}{L}} \end{pmatrix} b_{t-1,k},$$

$$\begin{pmatrix} 1 \\ e^{j2\frac{\phi_{range}}{L}} \\ e^{2j2\frac{\phi_{range}}{L}} \\ \vdots \\ e^{(N-1)j2\frac{\phi_{range}}{L}} \end{pmatrix} b_{t-1,k} \ldots,$$

$$\left. \begin{pmatrix} 1 \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}} \end{pmatrix} b_{t-1,k} \right\}$$

An updated codebook of Equation 8a includes a phase value of 0° and an updated codebook of Equation 8b excludes a phase value of 0°. Advantages for each case are as described previously in Equation 4. Although Equation 8a excludes one maximum phase value having a negative value, one maximum phase value having a positive value may be excluded as an alternative method.

A codeword having the best reception performance based on a received signal, for example, $b_{t,k}$, is selected, using an updated codebook $B_1$ generated by Equation 8a or Equation 8b.

The following Equation 9 shows an example of a codebook updating method which can be generated through the (t+1)-th codebook update operation.

$$B_{t+1} = \{b_{t+1,0}, b_{t+1,1}, \ldots, b_{t+1,N-1}\} \quad \text{[Equation 9]}$$
$$= \{P_N(\phi_0), P_N(\phi_1), \ldots, P_N(\phi_{L-1})\} \times b_{t,k}$$
$$= \{P_N(\phi_0) \times b_{t,k}, P_N(\phi_1) \times b_{t,k}, \ldots, P_N(\phi_{L-1}) \times b_{t,k}\}$$

In Equation 9, 't' of $B_{t+1}$ denotes the number of codebook updates. In the first codebook update operation, 't' is set to 1 and may be increased by 1 whenever the update operation is performed. Moreover, $b_{t,k}$ denotes a codeword selected from a codebook updated from an previous update operation, that is, the t-th update operation, and 'k' (where k=0, 1, 2, ..., N−1) denotes a codeword index within a codebook.

When using the above Equation 3 and Equation 4 as a method for determining a phase value, the updated codebook of Equation 9 may be expressed in more detail by the following Equation 10a and Equation 10b.

$$B_t = \{b_{t+1,0}, b_{t+1,1}, \ldots, b_{t+1,N-1}\} = \quad \text{[Equation 10a]}$$

$$\frac{1}{\sqrt{N}} \left\{ \begin{pmatrix} b_t \\ e^{-j\frac{(N-1)}{2}\frac{\phi_{range}}{L}} \\ e^{-2j\frac{(N-1)}{2}\frac{\phi_{range}}{2L}} \\ \vdots \\ e^{-(N-1)j\frac{(N-1)}{2}\frac{\phi_{range}}{2L}} \end{pmatrix} b_{t,k} \ldots, \right.$$

$$\begin{pmatrix} b_t \\ e^{-j2\frac{\phi_{range}}{L}} \\ e^{-2j2\frac{\phi_{range}}{L}} \\ \vdots \\ e^{-(N-1)j2\frac{\phi_{range}}{L}} \end{pmatrix} b_{t,k},$$

$$\begin{pmatrix} 1 \\ e^{-j\frac{\phi_{range}}{L}} \\ e^{-2j\frac{\phi_{range}}{L}} \\ \vdots \\ e^{-(N-1)j\frac{\phi_{range}}{L}} \end{pmatrix} b_{t,k}, \begin{pmatrix} 1 \\ 1 \\ 1 \\ \vdots \\ 1 \end{pmatrix} b_{t,k},$$

$$\begin{pmatrix} b_t \\ e^{j\frac{\phi_{range}}{L}} \\ e^{2j\frac{\phi_{range}}{L}} \\ \vdots \\ e^{(N-1)j\frac{\phi_{range}}{L}} \end{pmatrix} b_{t,k},$$

$$\begin{pmatrix} b_t \\ e^{j2\frac{\phi_{range}}{L}} \\ e^{2j2\frac{\phi_{range}}{L}} \\ \vdots \\ e^{(N-1)j2\frac{\phi_{range}}{L}} \end{pmatrix} b_{t,k} \ldots,$$

$$\left. \begin{pmatrix} b_t \\ e^{j\frac{N}{2}\frac{\phi_{range}}{L}} \\ e^{2j\frac{N}{2}\frac{\phi_{range}}{L}} \\ \vdots \\ e^{(N-1)\frac{N}{2}\frac{\phi_{range}}{L}} \end{pmatrix} b_{t,k} \right\}$$

$$B_t = \{b_{t+1,0}, b_{t+1,1}, \ldots, b_{t+1,N-1}\} = \quad \text{[Equation 10b]}$$

$$\frac{1}{\sqrt{N}}\left\{\begin{pmatrix} b_t \\ e^{-j\frac{N}{2}\frac{\phi range}{L}} \\ e^{-2j\frac{N}{2}\frac{\phi range}{2L}} \\ \vdots \\ e^{-(N-1)j\frac{N}{2}\frac{\phi range}{2L}} \end{pmatrix} b_{t,k} \ldots , \begin{pmatrix} b_t \\ e^{-j2\frac{\phi range}{L}} \\ e^{-2j2\frac{\phi range}{L}} \\ \vdots \\ e^{-(N-1)j2\frac{\phi range}{L}} \end{pmatrix} b_{t,k},\right.$$

$$\begin{pmatrix} 1 \\ e^{-j\frac{\phi range}{L}} \\ e^{-2j\frac{\phi range}{L}} \\ \vdots \\ e^{-(N-1)j\frac{\phi range}{L}} \end{pmatrix} b_{t,k}, \begin{pmatrix} b_t \\ e^{j\frac{\phi range}{L}} \\ e^{2j\frac{\phi range}{L}} \\ \vdots \\ e^{(N-1)j\frac{\phi range}{L}} \end{pmatrix} b_{t,k},$$

$$\begin{pmatrix} b_t \\ e^{j2\frac{\phi range}{L}} \\ e^{2j2\frac{\phi range}{L}} \\ \vdots \\ e^{(N-1)j2\frac{\phi range}{L}} \end{pmatrix} b_{t,k} \ldots ,$$

$$\left.\begin{pmatrix} b_t \\ e^{j\frac{N}{2}\frac{\phi range}{L}} \\ e^{2j\frac{N}{2}\frac{\phi range}{L}} \\ \vdots \\ e^{(N-1)\frac{N}{2}\frac{\phi range}{L}} \end{pmatrix} b_{t,k}\right\}$$

An updated codebook of Equation 10a includes a phase value of 0° and an updated codebook of Equation 10b excludes a phase value of 0°. This is as described in Equation 4. Although Equation 10a excludes one maximum phase value having a negative value, one maximum phase value having a positive value may be excluded as an alternative method.

Using an updated codebook $B_{t+1}$ generated as shown in Equation 10a or Equation 10b, a codebook, for example, $b_{t+1,k}$, having the best reception performance based on a received signal is selected.

Codebook update operations are performed several times by the above-described codebook updating mode. After the prescribed number of update operations is performed, codebook updating may be restarted using a base DEF codebook matrix or by resetting a phase value to 0 in order to prevent potential errors. Alternatively, a threshold value is preset and codebook updating may be restarted using the base DFT codebook matrix when the reception performance of a terminal is worse than the preset threshold value.

A codeword value of a codebook suitable for a current channel state varies due to the movement of a terminal or variations of communication environments. In particular, in beamforming, desired directions of a beam are changed by movement of the terminal. Accordingly, a channel state is reflected and a codebook can be updated using a codebook updating mode according to the embodiment of the present invention. If a specific codeword having good reception performance is selected from the updated codebook and is fed back, feedback information reflecting variable channels can be transmitted without increasing feedback overhead, thereby improving communication performance.

When updating the codebook, a new codeword value can be determined using a previous feedback codeword value. Therefore, a useful effect in a location tracking function of a mobile terminal in a MIMO system using codebook-based beamforming can be expected.

When applying a codebook-based MIMO precoding or diversity scheme, or a codebook-based beamforming scheme, basic technical features of a method performing feedback by updating a codebook can be shared. However, if antenna intervals are different, an additional construction may be used. Parameters, such as a phase range, a phase interval and the maximum number of codebook updates, may use optimized values according to system and communication environments rather than specific fixed values.

Hereinafter, an example of applying the above-described embodiment to a communication system including 4 transmit antennas (4-Tx) will be described.

The following embodiment shows a tracking method in a closed-loop MIMO precoding scheme applying a DFT based codebook. The following Equation 11 and Equation 12 illustrate a phase shift matrix and a DFT matrix, respectively, which can be used in this embodiment.

$$P(\phi_i) = \begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix} \quad \text{[Equation 11]}$$

$$B_1 = \{b_{1,0}, b_{1,1}, b_{1,2}, b_{1,3}\} \quad \text{[Equation 12]}$$

$$= \frac{1}{2}\left\{\begin{pmatrix} 1 \\ 1 \\ 1 \\ 1 \end{pmatrix}, \begin{pmatrix} 1 \\ j \\ -1 \\ -j \end{pmatrix}, \begin{pmatrix} 1 \\ -1 \\ 1 \\ -1 \end{pmatrix}, \begin{pmatrix} 1 \\ -j \\ -1 \\ j \end{pmatrix}\right\}$$

Figure 1:
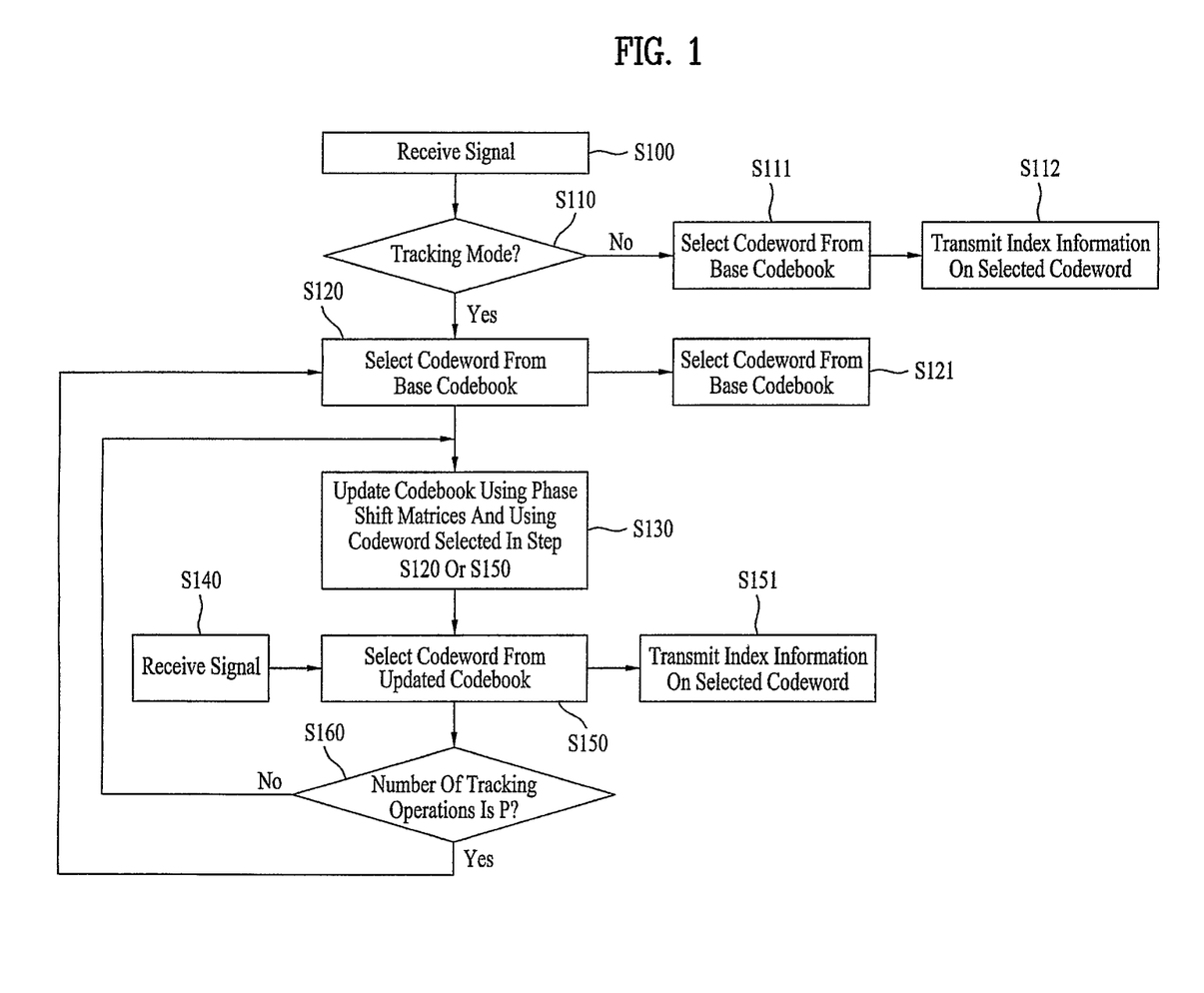
FIG. 1 is a flow chart illustrating a tracking operation in a receiving stage according to an exemplary embodiment of the present invention.

FIG. 1 is a flow chart illustrating a tracking operation in a receiving stage according to an exemplary embodiment of the present invention.

The tracking method using the phase shift matrix and the DFT matrix of Equation 11 and Equation 12 will now be described with reference to FIG. 1.

A receiving stage receives a signal from a transmitting stage to discern channel characteristics in step S100. The receiving stage determines whether to enter a tracking mode for performing a tracking operation in step S110. The order of steps S100 and S110 may be interchanged.

If the tracking mode is additionally designated, a general codebook may be shared. Namely, while closed-loop transmission/reception is performed using a codebook, if improvement in performance or reduction in the amount of feedback overhead is demanded, a mode can be easily changed to the tracking mode and therefore, complexity is lowered.

If it is determined not to proceed to the tracking mode in step S110, a codeword is selected from a base codebook in step S111 and index information as to the selected codeword is transmitted or fed back to the transmitting stage in step S112. The DFT matrix shown in Equation 12 may be used as the base codebook.

If it is determined to enter the tracking mode in step S110, a codeword is selected from the base codebook in step S120 and index information on the selected codeword is transmitted or fed back to the transmitting stage in step S121. As in step 111, the DFT matrix shown in Equation 12 may be used as the base codebook. An operation of steps S120 and S121 may be regarded as a first tracking operation.

When selecting the codeword in steps S111 and S120, a codeword suitable for channel characteristics discerned based on a received signal using a minimum mean squared error (MMSE) metric may be selected.

In step S130, the codebook is updated to be used when a tracking operation is performed twice or more. For example, the codebook is updated using a plurality of phase shift matrices having the selected codeword and phase values as parameters. As a method for updating the codebook, a method for determining a plurality of phase values, generating phase shift matrices for the determined phase values, and multiplying each of the generated phase shift matrices to the codeword selected in step S120.

The number of the plurality of phase values may be determined by the number of feedback bits. For example, if the number of feedback bits is 3, channel states transmitted by 3 bits is 8 ($=2^3$) and 8 phase shift matrices can be generated by determining 8 phase values.

An example of generating the phase shift matrices is shown in Equation 13 below.

$$P(\phi_0) = \begin{pmatrix} 1 & 0 & 0 & 0 \\ 0 & e^{j\phi_0} & 0 & 0 \\ 0 & 0 & e^{j2\phi_0} & 0 \\ 0 & 0 & 0 & e^{j3\phi_0} \end{pmatrix}$$

$$P(\phi_1) = \begin{pmatrix} 1 & 0 & 0 & 0 \\ 0 & e^{j\phi_1} & 0 & 0 \\ 0 & 0 & e^{j2\phi_1} & 0 \\ 0 & 0 & 0 & e^{j3\phi_1} \end{pmatrix}$$

$$\vdots$$

$$P(\phi_7) = \begin{pmatrix} 1 & 0 & 0 & 0 \\ 0 & e^{j\phi_7} & 0 & 0 \\ 0 & 0 & e^{j2\phi_7} & 0 \\ 0 & 0 & 0 & e^{j3\phi_7} \end{pmatrix}$$

[Equation 13]

Using the phase shift matrices shown in Equation 13 and the codeword selected in step S120, an example of the updated codebook is shown in Equation 14 below.

$$\begin{aligned} B_2 &= \{b_{2,0}, b_{2,1}, b_{2,2}, b_{2,3}\} \\ &= \{P(\phi_0), P(\phi_1), \ldots, P(\phi_l)\} \times b_{1,k} \\ &= \{P(\phi_0) \times b_{1,k}, P(\phi_1) \times b_{1,k}, \ldots, P(\phi_l) \times b_{1,k}\} \end{aligned}$$

[Equation 14]

In step S140, channel characteristics are discerned by receiving a signal. A codeword capable of optimizing signal reception performance is selected from the updated codebook based on the channel characteristics discerned in step S150. In step S151, index information about the selected codeword is transmitted to the transmitting stage in step S151.

The codeword selected from the updated codebook is fed back, and if it is desired to continuously perform a tracking operation, the tracking operation may be performed based on previous transmission up to a prescribed number of times. In FIG. 1, the number of tracking operations is set to P. Until the number of tracking operations reaches P, the codebook is updated based on the previously selected codeword.

For example, if the third tracking operation is performed, the codebook is again updated in step S130. A method for updating the codebook is similar to the method used in the previously described step S130. In this case, however, the codeword selected in step S150 is used unlike as in the previously described step S130.

An example of a codebook updated using the codeword selected in step S150 is shown in Equation 15.

$$\begin{aligned} B_3 &= \{b_{3,0}, b_{3,1}, b_{3,2}, b_{3,3}\} \\ &= \{P(\phi_0), P(\phi_1), \ldots, P(\phi_l)\} \times b_{2,k} \\ &= \{P(\phi_0) \times b_{2,k}, P(\phi_1) \times b_{2,k}, \ldots, P(\phi_l) \times b_{2,k}\} \end{aligned}$$

[Equation 15]

Through the above-described tracking operation, codebook updating according to a channel variation can be performed without additional feedback overhead.

If the number of tracking operations is P in step S160, a codebook is selected based on the base codebook in step S120 and a tracking operation is again performed. This provides an opportunity to correct errors due to accumulated tracking operations. Such an initialization process entails resetting a phase of the phase shift matrix to 0 at intervals of a repetition period P.

As another exemplary embodiment, the base codebook shown in Equation 12 is configured to use the base DFT matrix and to include a codeword for a plurality of ranks.

The following Equation 16 shows an example of a base codebook which can include codewords for a plurality of ranks, when the number of feedback bits is 4.

$B_1=\{b_{1,0},b_{1,1},b_{1,2},b_{1,3},b_{1,0},b_{1,1},b_{1,0},b_{1,2},b_{1,0},b_{1,3},b_{1,1},$
$b_{1,2},b_{1,1},b_{1,3},b_{1,2},b_{1,3}, b_{1,0},b_{1,1},b_{1,2},b_{1,0},b_{1,1},b_{1,3},$
$b_{1,0},b_{1,2},b_{1,3},b_{1,1},b_{1,2},b_{1,3},b_{1,1},b_{1,2},b_{1,3},b_{1,4}\}$ [Equation 16]

In Equation 16, $b_{1,k}$ may refer to the same column vector as each codeword of the codebook of Equation 12.

Although the above-described tracking method is described based on the receiving stage, the transmitting stage may update the codebook to perform precoding by the same method. That is, if the transmitting stage is determined to operate in a tracking mode, the same method should be used to update the codebook so that the receiving stage selects a codeword corresponding to the transmitted feedback information and performs precoding.

A codebook size L according to the number of feedback bits, a phase interval, the number P of repetitions for resetting a phase value of the codebook, and a transmission period of feedback codeword index may be optimally designed in consideration of tracking performance according to channel environments, the amount of overhead of the feedback codeword index.

Figure 2:
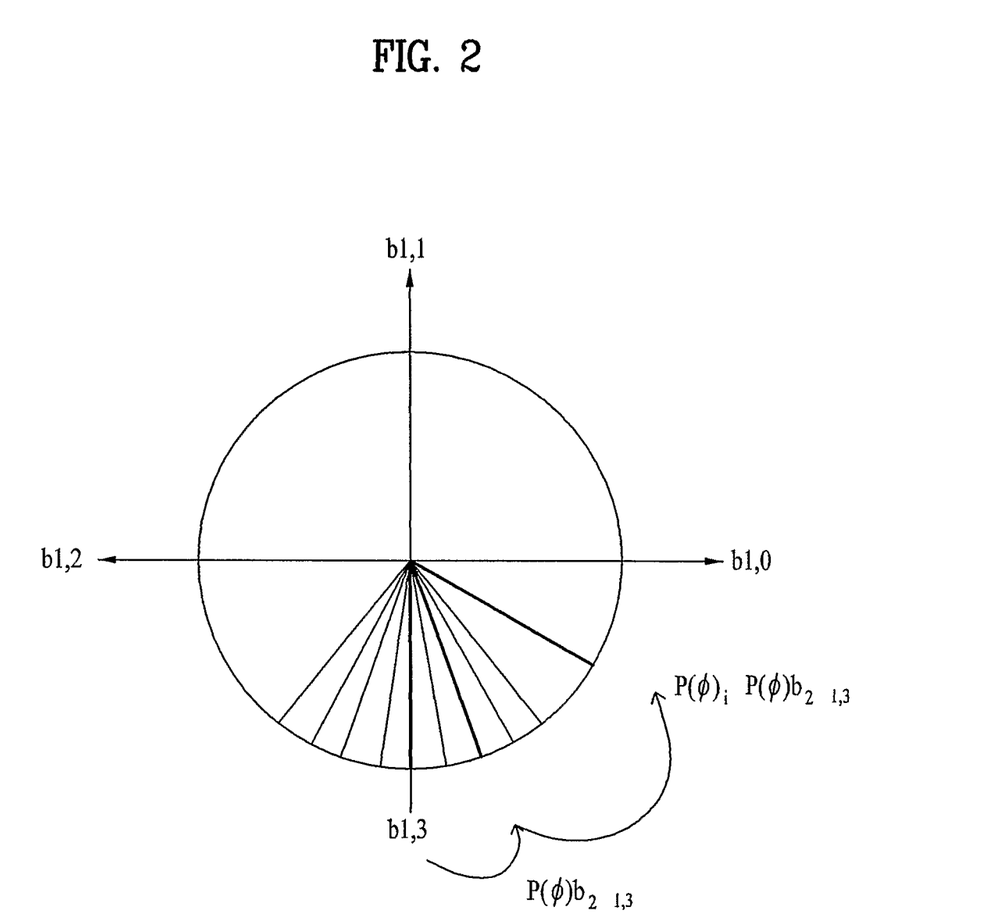
FIG. 2 is a view illustrating a phase shift flow when a tracking operation is performed according to an exemplary embodiment of the present invention.

FIG. 2 is a view illustrating a phase shift flow when a tracking operation is performed according to an exemplary embodiment of the present invention.

In the first tracking operation, if a codeword $b_{1,3}$ is selected based on a base codebook, a next tracking operation is performed based on that value. In a second tracking operation, a codebook is updated using $P(\phi_i)$ (where i=0, 1, ..., L−1) and the codebook $b_{1,3}$ selected from the base codebook. An optimal codeword is selected in consideration of channel characteristics of a received signal from the updated codebook. For example, assuming that a codeword $P(\phi_2)b_{1,3}$ is selected, a phase of the codebook proceeds to $P(\phi_2)b_{1,3}$ based on the codeword $b_{1,3}$. Similarly, during next transmission, a phase is shifted from $P(\phi_2)b_{1,3}$ to $P(\phi_i)P(\phi_2)b_{1,3}$ according to channel variations.

The above-described codebook tracking method is used together with a MIMO precoding scheme using Household or Discrete Fourier Transform, thereby improving performance of MIMO precoding to some degree.

Figure 3:
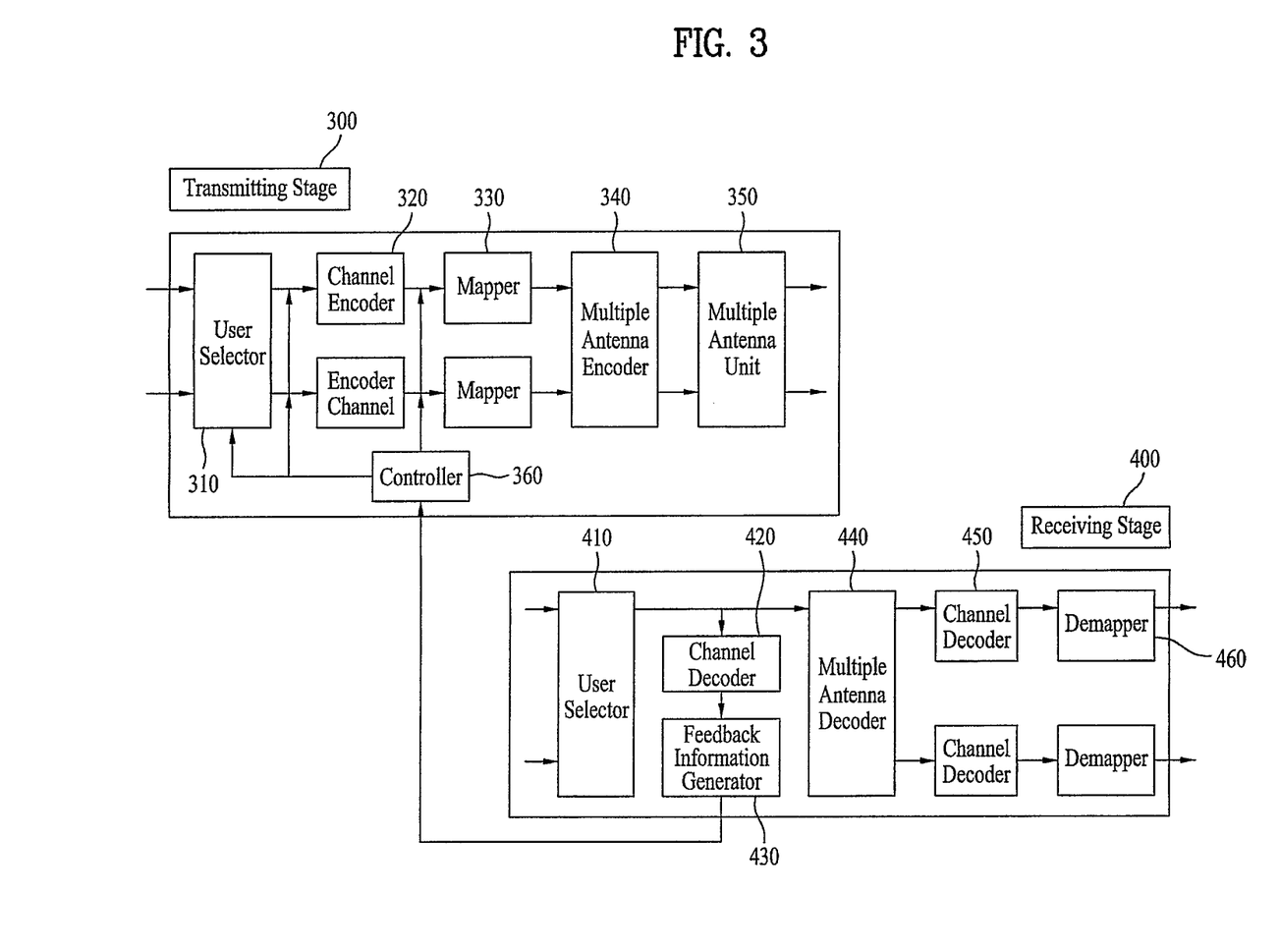
FIG. 3 is a view illustrating an example of the structure of transmitting and receiving stages to which the exemplary embodiment of the present invention is applicable.

FIG. 3 is a view illustrating an example of the structure of a transmitting/receiving stage to which the exemplary embodiment of the present invention is applicable.

A general structure of a MIMO system using an orthogonal frequency division multiplexing (OFDM) scheme among antenna transmit/receive technologies will now be described with reference to FIG. 3.

In a transmitting stage 300, user data is input to a channel encoder 320 as a single stream or multiple data streams through a user selector 310. The channel encoder 320 reduces an influence due to channels or noise by adding a redundancy bit to the transmission data bit. A mapper 330 converts data bit information into data symbol information through various methods such as a constellation mapping method, etc. A multiple antenna encoder 340 converts a parallelized data symbol into a space-time signal. When performing precoding, symbolized data may be multiplied by a codebook codeword or a precoding vector. A signal is transmitted using multiple antennas through a multiple antenna unit 350.

In a receiving stage 400, a multiple antenna unit 410, a multiple antenna decoder 440, a channel decoder 450, and a demapper 460 perform reverse functions of the multiple antenna unit 350, the multiple antenna encoder 340, the channel encoder 320, and the mapper 330.

A channel estimator 420 discerns channel characteristics through a received signal. A feedback information generator 430 selects an optimal codeword from a codebook in consideration of the channel characteristics obtained by the channel estimator 420 according to the embodiment of the present invention and feeds back codeword information to the transmitting stage 300.

A controller 360 of the transmitting stage 300 selects a modulation and coding scheme (MCS) level or precoding codewords using the feedback information from the receiving stage 400. Although not shown in the drawings, each antenna of the transmitting stage may transmit a common pilot signal which is not precoded so that the channel estimator 420 of the receiving stage can estimate a channel H.

It is apparent that the present invention may be embodied by a combination of claims which do not have an explicit cited relation in the appended claims or may include new claims by amendment after application.

The exemplary embodiment of the present invention may be achieved by various means, for example, hardware, firmware, software, or a combination thereof. In a hardware configuration, a method for transmitting feedback information and a method for precoding information in a codebook-based MIMO system according to the exemplary embodiment of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method for transmitting feedback information and a method for precoding information in a codebook-based MIMO system according to the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A feedback method in a multiple-input multiple-output (MIMO) system using a codebook, comprising:
    estimating a reception channel by receiving a signal; and
    feeding back a codeword selected based on the estimated channel from a codebook which is updated using a phase shift matrix having phase values as parameters and previous feedback information,
    wherein each of the phase values is reset to 0° at a preset repetition period.

2. The method according to claim 1, the method is repeatedly performed a predetermined number of times.

3. A method for transmitting precoding information in a multiple-input multiple-output (MIMO) system using a codebook-based precoding scheme, comprising:
    determining to operate in a codebook updating mode;
    feeding back first precoding information selected from a first codebook;
    receiving a signal; and
    feeding back second precoding information selected from a second codebook based on channel characteristics of the received signal,
    wherein the second codebook is configured by a phase shift matrix having phase values as parameters and using the first precoding information,
    wherein the second codebook determines a plurality of phase shift matrices by determining a plurality of phase values and determines codebook codewords by multiplying each of the determined phase shift matrices by a vector component according to the first precoding information to include the determined codebook codewords.

4. The method according to claim 3, wherein the phase values are determined by adding or subtracting integral times of a phase interval to or from the first precoding information.

5. The method according to claim 4, wherein the phase interval is generated by equally dividing a predetermined phase range into a number corresponding to the number of feedback bits.

* * * * *